United States Patent
Rehmat

(10) Patent No.: US 9,557,058 B2
(45) Date of Patent: Jan. 31, 2017

(54) GAS DISTRIBUTOR FOR A ROTARY KILN

(71) Applicant: Amirali G. Rehmat, Darien, IL (US)

(72) Inventor: Amirali G. Rehmat, Darien, IL (US)

(73) Assignee: Simple Approach Systems, Inc., Schaumburg, IL (US)

( * ) Notice: Subject to any disclaimer, the term of this patent is extended or adjusted under 35 U.S.C. 154(b) by 587 days.

(21) Appl. No.: 13/733,492

(22) Filed: Jan. 3, 2013

(65) Prior Publication Data

US 2013/0119315 A1   May 16, 2013

Related U.S. Application Data

(63) Continuation of application No. 12/478,585, filed on Jun. 4, 2009, now abandoned.

(30) Foreign Application Priority Data

Sep. 6, 2008   (IN) .......................... 1396/CHE/2008

(51) Int. Cl.
    *B01J 7/00*    (2006.01)
    *F23L 7/00*    (2006.01)
    (Continued)

(52) U.S. Cl.
    CPC . *F23L 7/00* (2013.01); *F27B 7/36* (2013.01); *C10J 3/005* (2013.01); *Y10T 137/85938* (2015.04)

(58) Field of Classification Search
    CPC .............. C10J 3/005; C21B 13/08; F23G 5/20
    See application file for complete search history.

(56) References Cited

U.S. PATENT DOCUMENTS 4,181,504 A * 1/1980 Camacho .................. C10J 3/20
                                                      110/250
4,208,181 A * 6/1980 Rossi ........................ F27B 7/10
                                                      266/96

(Continued)

OTHER PUBLICATIONS

J.H. Howson and K. Casnello "Risk Reduction Measures for the Development of Biomass Rotary Kiln Gasification," Report No. ETSU B/U1/00646/REP and DTI/Pub URN 02/754, . . . .

(Continued)

*Primary Examiner* — Imran Akram
(74) *Attorney, Agent, or Firm* — Baker Donelson; Nigamnarayan Acharya

(57) ABSTRACT

A rotating air distributor for rotary reactors such as rotary kilns for the gasification of biomass and other carbonaceous materials for efficient mixing and maximum conversion of solid biomass and other carbonaceous materials into synthesis fuel gas is disclosed. The invention includes a gas distribution port comprises of one main supply from which several discharge nozzles emerge at different angles and at different locations along the length of the reactor to provide distribution of gas throughout the intended length of the reactor. The discharge of gas from the gas distribution port is adjusted by the variable position of a plug inside the port that can be adjusted during the operation of the kiln to achieve optimum gas-solid interaction along the length of the reactor. The rotating action of the gas distribution port also facilitates and eases the passage of reacted biomass solid and other carbonaceous material residue through the reactor.

10 Claims, 7 Drawing Sheets

(51) Int. Cl.
*F27B 7/36* (2006.01)
*C10J 3/00* (2006.01)

(56) References Cited

U.S. PATENT DOCUMENTS

| | | | | |
|---|---|---|---|---|
| 4,273,314 A * | 6/1981 | Keran | .................... | C21B 13/08 266/145 |
| 4,318,713 A * | 3/1982 | Lee | .................... | C10J 3/005 48/203 |
| 4,336,769 A * | 6/1982 | Daman | .................... | B01J 8/36 110/229 |
| 4,678,491 A * | 7/1987 | Tsai | .................... | C03B 3/02 432/110 |
| 4,834,646 A * | 5/1989 | Terashima | .................... | F27B 9/12 432/144 |
| 5,451,255 A * | 9/1995 | Hansen | .................... | C04B 7/44 106/743 |
| 5,548,611 A * | 8/1996 | Cusick | .................... | B09B 3/0066 373/18 |
| 5,549,058 A * | 8/1996 | Tutt | .................... | C04B 7/4438 110/109 |
| 5,632,616 A * | 5/1997 | Tutt et al. | .................... | 432/105 |
| 2002/0086258 A1* | 7/2002 | Hansen | .................... | F27B 7/00 432/103 |
| 2009/0277090 A1* | 11/2009 | Rehmat | .................... | C10J 3/005 48/113 |
| 2012/0217442 A1* | 8/2012 | Jeney | .................... | F23G 5/0276 252/373 |

OTHER PUBLICATIONS

G.P. Androutsopoulos, K.S. Hatzilyberis, "Electricity Generation and Atmospheric Pollution: The Role of Solid Fuels Gasification" presented at 7th International Conference . . . .

Francesco Fantozzi, Bruno D'Alessandro, and Umberto Desideri, An IPRP (Integrated Pyrolysis Regenerated Plant) Microscale Demonstrative Unit in Central Italy: Proceedings . . . .

* cited by examiner

GAS DISTRIBUTOR FOR A ROTARY KILN

PRIOR RELATED APPLICATION DATA

This application is a continuation of U.S. application Ser. No. 12/478,585, filed Jun. 4, 2009, which claims priority to Indian Patent Application No. 1396/CHE/2008, filed Sep. 6, 2008, the entire content of which is incorporated herein by reference in its entirety.

FIELD

This invention relates to rotary reactors such as rotary kiln for the gasification of solid carbonaceous materials such as biomass and solid wastes and particularly to the gas distributor for introducing gases such as air, oxygen, and steam to the interior of the rotary kiln wherein this gas distributor assures gas solid mixing inside the reactor to promote gas solid reaction.

GENERAL BACKGROUND AND THE STATE OF THE ART

In the last two decades or so, interest in biomass gasification has picked up as means of producing energy from renewable resources to supplement fossil fuels as well as to develop strategy for distributed generation for reasons of meeting energy security needs. This renewed interest has encouraged development of new and improved methods for making biomass gasification efficient and fuel gas generated from these cleaner in terms of its tar content. Biomass typically comprises collectable, plant-derived materials that may be abundant and relevantly inexpensive in comparison to fossil fuels. Additionally, biomass may be potentially convertible to feedstock chemicals or used for electricity generation. Some examples of sources of biomass may be, without limitation, wood, grass, agriculture and farm wastes, manure, waste paper, rice straw or rice husks, corn stores, corn cobs, sorghum stover, poultry litter, sugarcane bagasse, waste resulting from vegetable oil extraction, peanut shells, coconut shells, shredded bark, food waste, urban refuse and municipal solid waste.

The present invention is directed to a reactor vessel in which solid, liquid and gaseous organic wastes such as but not necessarily limited to forestry and agricultural residues, animal wastes, bacterial sludge, sewage sludge, municipal solid waste, food wastes, animal bovine parts, fungal material, industrial solid waste, waste tires, coal washing residue, petroleum coke, oil shale, coal, peat and lignite, waste oil, industrial liquid wastes, residuals from petroleum refining and volatile organic compounds generated by the industrial processes are transformed into gaseous fuels with maximum conversion efficiency while maintaining resultant synthesis fuel gas free of tar and oil. The organic materials of this type commonly referred to as carbonaceous materials include fixed carbon, volatile matter and ash.

Moisture present with all of the carbonaceous is also included in the volatile matter. The primary objective of the transformation is to obtain essentially complete conversion of carbon and volatile matter into synthesis fuel gas, while leaving only ash as solid residue. This transformation of the organic material takes place by combining these organic materials with steam and air or oxygen in a high temperature environment. Gas-solid contact, the temperature and the time allocated for gas-solid contact at a given temperature all play a role in the extent of conversion of the organic material introduced into the reactor vessel. Most of the time, the moisture content of the organic feed material is adequate for the transformation reactions. However, the present invention also includes the benefits of introducing additional moisture to produce uniform quality of the synthesis gas from this apparatus. The present invention does not preclude pre-drying of the organic feed material prior to its introduction into the reactor vessel.

The advantages of converting organic material into synthesis fuel gas over directly combusting the carbonaceous material are quite significant. Direct combustion of carbonaceous materials mentioned above usually results in smoke and discharge of unwarranted polluting compounds to the detriment of human health. Besides, direct combustion results in deposition of tar in the chimneys which poses a fire hazard. In contrast, the synthesis fuel gas, after production and clean-up, contains simple clean burning combustible gases, namely carbon monoxide, hydrogen and some methane along with non-combustible nitrogen, carbon dioxide and water vapor. This synthesis fuel gas is also suitable for fuel use for internal combustion engines.

The ideal device for the transformation of carbonaceous material into synthesis fuel gas would comprise of ability to introduce all types of carbonaceous materials without limitations in reason of its origin, size, and composition and that would also provide ideal mixing between solids present in the device and gas including air and steam that is introduced into the apparatus. There are number of devices that are capable of transforming all sorts of carbonaceous materials into synthetic fuel gas; however, none of them are without limitations.

For example, the bubbling fluidized bed reactors are well known for providing ideal contact between solids and gases; however, these devices lack versatility with respect to handling multiple types and sizes of carbonaceous materials. The operation of fluidized bed device is generally restricted to one particular type and one size of carbonaceous material since any variation in these would upset the delicate balance between fluidization velocity and the size of the carbonaceous material as well as the balance between the composition of the carbonaceous material and amount of reaction gases such as air and steam introduced into the reactor.

Another example of reactor with good contact between solid and gas is the circulating entrained bed reactor. This type of reactor increases contact time between the solids and gases by continuous recirculation of the solids inside the reactor vessel. Again this type of reactor lacks versatility with respect to type and size of the carbonaceous material.

In the small-scale category of the available reactors, common ones are updraft gasifiers, downdraft gasifiers, and cross-draft gasifiers. All of these types of reactors have restrictions with respect to the density and the size of the carbonaceous material they can handle. Besides none of these reactors have ability to provide ideal mixing between solids and gases which is a prerequisite for obtaining maximum conversion of carbonaceous material into synthesis fuel gas. As a result of poor mixing, these reactors lose significant amount of carbon with the solid residue. In comparison to all of the aforementioned devices, the rotary reactor such as kiln is most flexible and versatile in terms of handling vast array of carbonaceous material irrespective, within reasons, of type, composition, and size. The rotary kiln device is also suitable for operating at full load and part load as necessitated by synthesis fuel gas demand or by availability of the carbonaceous material. The primary weakness of the rotary kiln is gas solid mixing without which it is difficult to attain high conversion of carbonaceous fuel into synthesis fuel gas. In a study performed by CPL Industries (Reference 1), it was quite apparent that without allowing provisions for suitable mixing inside the kiln it was not possible to attain high transformations of carbonaceous fuel into synthesis fuel gas. Without adequate mixing between solids and gases, the air and steam has tendency to bypass reaction with solids and instead prefers to react with gases thereby impairing the quality of synthesis fuel gas with respect to its heating value. Moreover the bypassing of air and steam results in lower conversion of carbonaceous material and hence lot of carbon is lost with the solid residue.

The present invention provides an apparatus to introduce air, steam, and other gases which when installed inside of the rotating reactor such as kiln tremendously improves gas solid mixing inside the reactor and thereby assures maximum conversion of carbonaceous material into synthesis fuel gas. With this ability for gas solid mixing and its inherent flexibility with respect to accepting wide array of carbonaceous material irrespective of type, composition, and size; and combined with its ability to operate within large variation of loading of the carbonaceous material, the kiln reactor would become the reactor of choice for distributed power generation for smaller and larger applications.

Some prior attempts to provide improved gas solid mixing in a rotary kiln as well as attempts to improve conversion of carbonaceous material into synthesis fuel gas in rotary kiln by indirect means are mentioned below.

SUMMARY OF THE INVENTION

According to a preferred embodiment of the present invention, there is provided a port assembly secured by the stationary plate of the rotary kiln and positioned for communication with the interior of the rotary kiln. The port assembly comprises of a main conduit for introducing gases such as air, oxygen and steam into the kiln as well as several nozzles extending from the main conduit for distribution of gases into the kiln as well as to promote intimate mixing between gases emerging from these nozzles and solids present in the kiln. The main conduit extends approximately two thirds of the way into the kiln if the kiln is operating as a gasifier. The conduit will extend all the way to the end of the kiln if the kiln is operating as a combustor. A movable gas plug is inserted inside of the main conduit. The position of this gas plug determines the length of the kiln into which reactant gases are introduced. This flexibility is essential because in the case of gasification of the carbonaceous material, it is first necessary to combust portion of the carbonaceous material with air or oxygen to provide energy necessary to carry out the reactions between gases and solids and also to maintain temperature in the reactor that would sustain endothermic reactions between steam and the carbonaceous materials to yield synthesis fuel gas. In contrast, combustion of carbonaceous material is completely consumed by air or oxygen supplied to the kiln and therefore the air is supplied throughout the reactor. In fact, for combustion, additional air beyond that required for complete combustion is introduced into the kiln to absorb the heat and to control run away condition with respect to temperature. The conduit is blocked at the far end of the assembly so that there is sufficient discharge of gases through the nozzles.

The number and spacing of the nozzles depends upon the size of the apparatus and the corresponding gas flow required for the process. The following description is one of many applications of this invention. The person familiar with the art will readily recognize the possibility multiple arrangements of this port assembly as well as multiple applications associated with this port assembly. All of these arrangements and applications are implied and included in this invention.

The port assembly in this invention will work best if minimally three nozzles are associated with each of the designated conduit circumference for nozzle installation. This number would increase depending upon the conduit diameter and the amount of gas flow passing through the main conduit. These circumferential nozzles are repeated along the length of the main conduit. Again minimally three rows of nozzles are preferred, each row being equidistance from the other. This number would increase depending upon the length of the kiln and amount of gas introduced into the kiln.

All nozzles protruding from the main conduit will be installed at an angle that varies from minus 60 degrees to plus 60 degrees from the vertical orientation. Vertical orientation implies that the nozzle is installed perpendicular to the main conduit. This invention incorporates all possible orientation with respect to each of the nozzle installed onto the main conduit. All the nozzles can be mounted uniformly using one particular angle; or mounted non-uniformly facing towards or away from one another with each at the same or different angle.

For the particular application of gasifying carbonaceous material in the rotary kiln, all the nozzles protruding from the main conduit will protrude towards the wall of the kiln terminating 6 to 12 inches from the wall to allow free passage of solids along the wall of the kiln and along the length of the kiln. This dimension, however, is not general and the determination of the termination of these nozzles from the proximity of the kiln wall will largely depend upon the material being processed in the kiln and therefore it will vary from application to application.

In general, the diameter of the nozzles at any given circumference of the port assembly will be identical, although not necessary. However, the diameter of nozzles as they move into the kiln will become successively larger along the main conduit to reduce the pressure drop across them so that the gas flow can pass unhindered through all the nozzles.

In order to reduce the effect of direct impingement of gas jet onto the wall of the kiln, suitable muzzle devices can be installed

DETAILED DESCRIPTION

Figure 1:
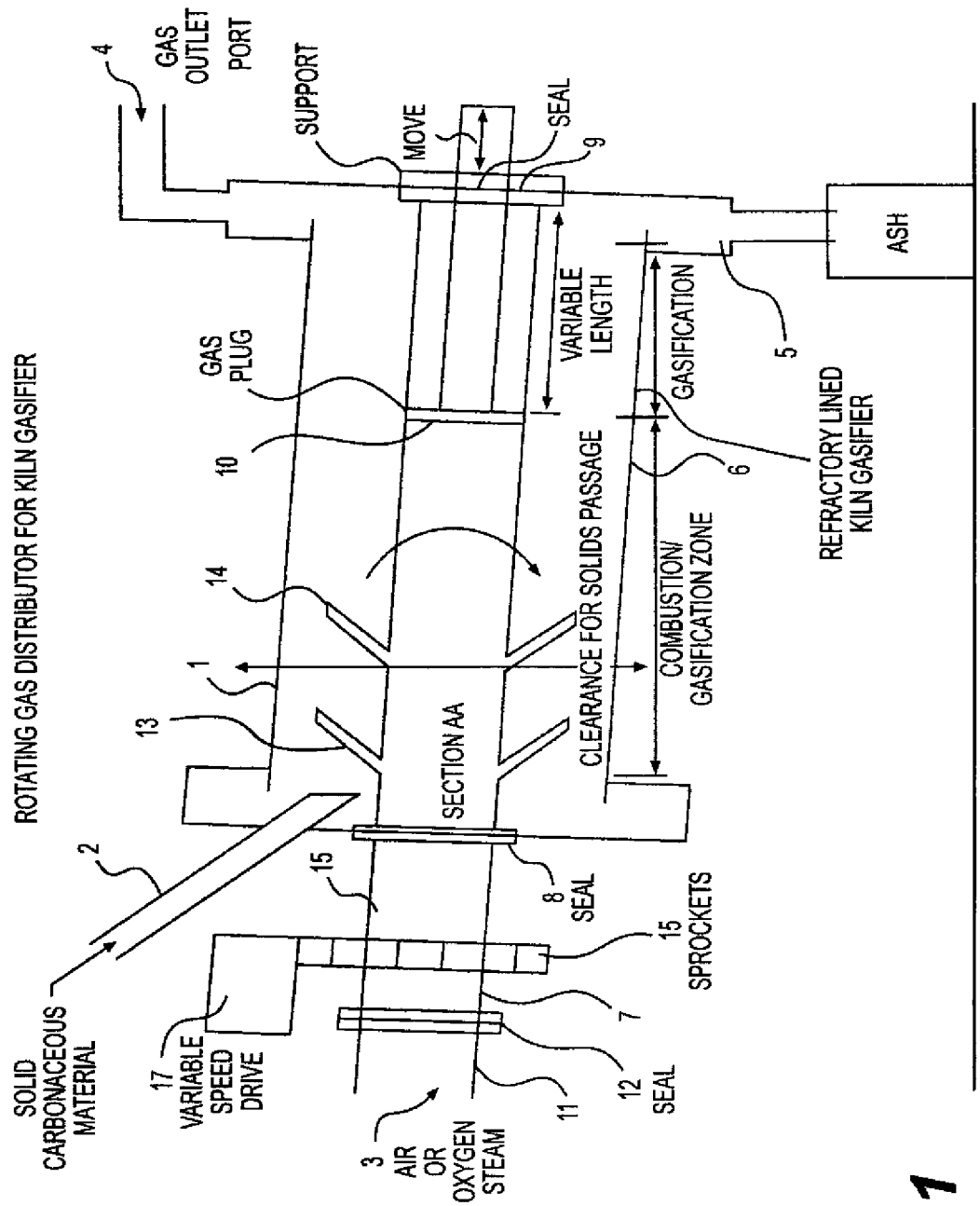
FIG. 1 is a schematic of rotary kiln gasifier with rotating gas distributor.

FIG. 1 depicts one of many types of rotary kiln apparatus with which the present invention can be practiced. Referring to FIG. 1, the rotary kiln gasifier 1 is a hollow refractory lined vessel with suitable inlets for feeding carbonaceous material 2, suitable inlet for feeding reactant gases such as air and steam 3, suitable outlet for fuel gas 4, and suitable outlet for ash 5. The rotary kiln depicted in FIG. 1 can also operate as combustor with equal effectiveness. The gasifier 1 should be large enough to gasify desired capacity of carbonaceous material and to provide adequate residence time for the gasification reactions between carbonaceous materials and the gaseous reactants. The interior of the gasifier 1 is preferably refractory lined 6 or alternatively surrounded by heat transfer devices such as tubes containing flowing liquids to absorb heat. The refractory lined kiln is preferred because the hot refractory retains heat and transfers that heat to the carbonaceous material coming in its contact thereby raising the temperature of the said carbonaceous material and thereby making it easier for gaseous reactant to initiate gasification reactions with the said solids.

Because of the nature of the rotating kiln, when the carbonaceous solid material is introduced into the said kiln, the solid carbonaceous material generally gravitates towards the walls of the said kiln. In contrast the flow of gas introduced at the head of the kiln flows through the middle of the kiln and as a result minimal interaction between the solids and gas is expected in this type of devices. In order to get maximum benefit out of this type of devices it is essential to maximize gas-solid interaction. This is exactly what the rotating gas distributor 7 of the present invention achieves.

The rotating gas distributor 7 is essentially a gas port as a means of introducing and distributing reactant gases such as air, oxygen, and steam into the rotary kiln gasifier or the rotary kiln combustor to attain maximum interaction between the solid carbonaceous material present in the kiln with the reactant gases that are being introduced through the said gas distributor. The gas port 7 is supported at both ends of the kiln by the front and rear hoods of the kiln with flexible sealed insertions 8 and 9 respectively. Although the port comprises of a continuous conduit for providing support, the gas passage through the port is terminated at the appropriate location by means of a solid gas plug 10 inside the kiln depending upon the operation of the kiln as a gasifier or as a combustor. The gas plug 10 is mounted onto the conduit (insert no) so that its location can be manipulated from outside of the rotary kiln. This plug 10 restricts the introduction of oxygen-bearing reactant gases to about two thirds of the way into the kiln, when operating as a gasifier, to facilitate partial oxidation reactions between the solid carbonaceous material and the oxygen in order to provide necessary heat of reaction for endothermic reaction between steam and carbonaceous material which is allowed to be carried out throughout the length of the kiln gasifier 1. The selection of two thirds of the way into the gasifier for the introduction of oxygen-bearing gases is not to be construed as absolute since this distance will vary according to the properties of the carbonaceous material being processed as well as amount of oxygen introduced into the gasifier. The person knowledgeable in the art of gasification of carbonaceous materials would easily recognize that specific generalization for the extent of insertion of oxygen-bearing gases cannot be made and that the invention covers all possible insertions as are necessary for the efficient utilization of the carbonaceous solid materials. The gas plug 10 is positioned all the way to the end of the kiln, near the exit of the gas, when the kiln is operating as a combustor so that the oxygen bearing gases are supplied to the length of the kiln.

The reactant gases such as air, oxygen, and steam are supplied to the rotating port by means of a fixed conduit communicating with rotating port 7 via a flexible seal connection 12.

In order to effectively distribute the reactant gases in the vicinity of the solids, the port is fitted with number of nozzles distributed along the length and circumference of the port such as 13 and 14 as depicted in FIG. 1. These nozzles protrude from the port and terminate some distance from the wall of the kiln gasifier 1. The plurality of the nozzles will depend upon the size of the kiln gasifier 1 and the capacity with respect to processing carbonaceous material through the gasifier. Typically the nozzles will terminate six to twelve inches from the wall of the rotary kiln gasifier; however, this distance is adjusted according to the size and the capacity of the gasifier.

The gas distributor assembly 7 is fitted externally with sprockets 15 which are connected to reversible variable speed drive so that the gas distributor can be rotated at various speeds. The gas distributor 7 can be operated in a stationary mode or rotated clockwise or counterclockwise. The rotation of the gas distributor 7 in the same direction as the kiln gasifier 1 rotation will tend to confine the solid carbonaceous material inside the kiln pegged to the walls of the gasifier 1 and the heat of reaction for the gasification will be supplied by the heat retained by the refractory via heat conduction and by the heat generated from partial combustion of the said carbonaceous solids. When the gas distributor 7 is rotated in the direction opposite to the motion of the kiln gasifier 1, the shear forces generated by the gas jets impinging on the walls of the gasifier 1 will tend to strip the particles of the carbonaceous material off the walls of the gasifier 1 and react with them with the help of heat of reaction being supplied by the convection and the radiation from the hot walls of the gasifier 1 as well as from the heat generated from partial combustion of carbonaceous solids. When the gas distributor 7 is operated in a stationary mode, the relative velocity of the kiln gasifier 1 rotation with respect to the gas distributor 7 will dictate the fate of gas solid reactions within the bounds of the gasifier 1. Each mode of operation is covered by this invention.

Figure 2:
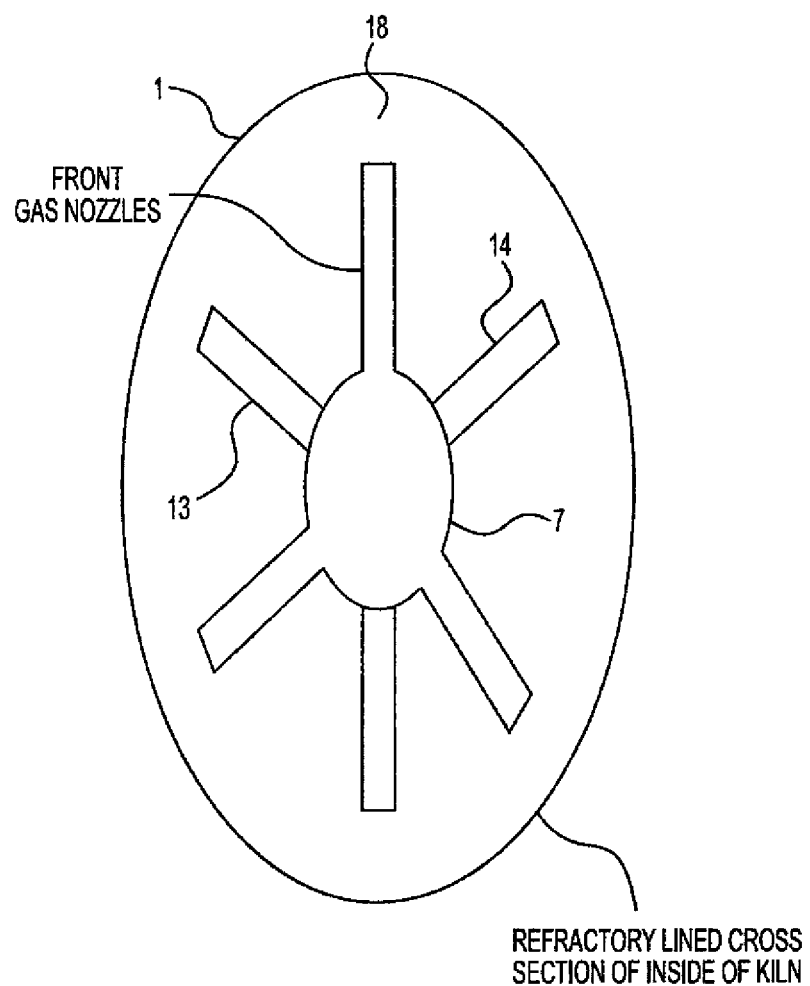
FIG. 2 is a cross section of the rotary kin gasifier with rotating gas distributor.

FIG. 2 is a cross section of the kiln gasifier 1. It illustrates the communication between the main gas port 7 and the nozzles depicted by 13 and 14. It also depicts the allowance of space 18 between the termination of the nozzles 13 and 14 and the refractory wall of the kiln gasifier 1. This allowance of the space 18 enables the kiln gasifier 1 to maintain conventional profile of solids within the confines of the kiln gasifier 1.

Figure 3:
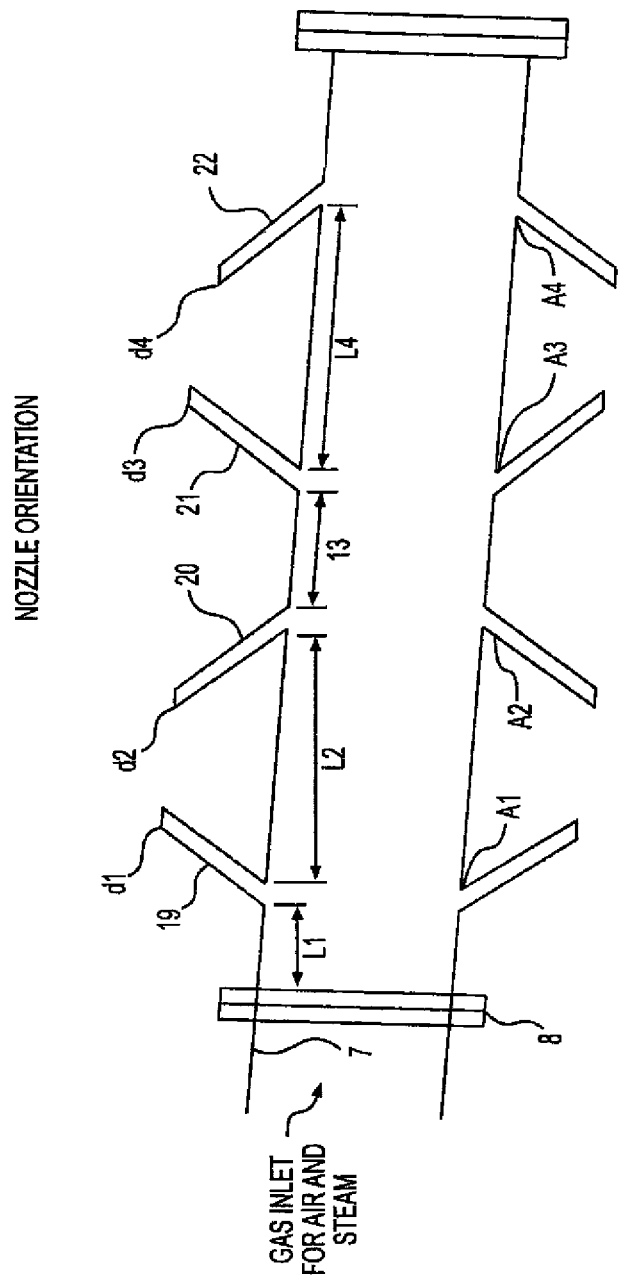
FIG. 3 is a depiction of an example of gas distributor to indicate its structure with respect to nozzle angles and nozzle diameters.

FIG. 3 illustrates the plausibility of spacing and angles for positioning nozzles onto the main gas port 7. The number and the inclination of the nozzles will largely depend upon the amount of turbulence required for effective gas solid contact in the vicinity of the walls of the kiln gasifier 1. The inclinations of each of the nozzle can be different from the other implying that the angles A 1, A 2, A 3 and A 4 can be equal or totally different from one another. Similarly circumferential distances along the length of the gas port 7 can be equal or not equal implying that the distances between the nozzles depicted as L1, L2, L3, and L4 can be equal or totally different from one another. As depicted in FIG. 3, all directional orientations of the nozzles emanating from the main gas port 7 are covered by the invention.

In order to obtain equitable gas distribution from the port into the nozzles 19, 20, 21, and 22 depicted in FIG. 3, the diameter of nozzles at successive circumferential location away from the inlet seal 8 of the gasifier 1 will be successively larger to take advantage of pressure drops to minimize the flow disparity from nozzle to nozzle. Therefore for uniform gas flow from all nozzles throughout the length of the gas port 7, the relationship between diameters d1, d2, d3, and d4 of the nozzles 19,20,21, and 22 in FIG. 3 will be such that d4 will be greater than d3; d3 will be greater than d2, and d2 will be greater than d1. However if unequal distribution of gas is desired along the path of the kiln gasifier 1 from the standpoint of controlling gas solid reaction, these diameters d1, d2, d3, and d4 of the nozzles 19, 20, 21, and 22 can be manipulated to obtain the desired results.

Figure 4:
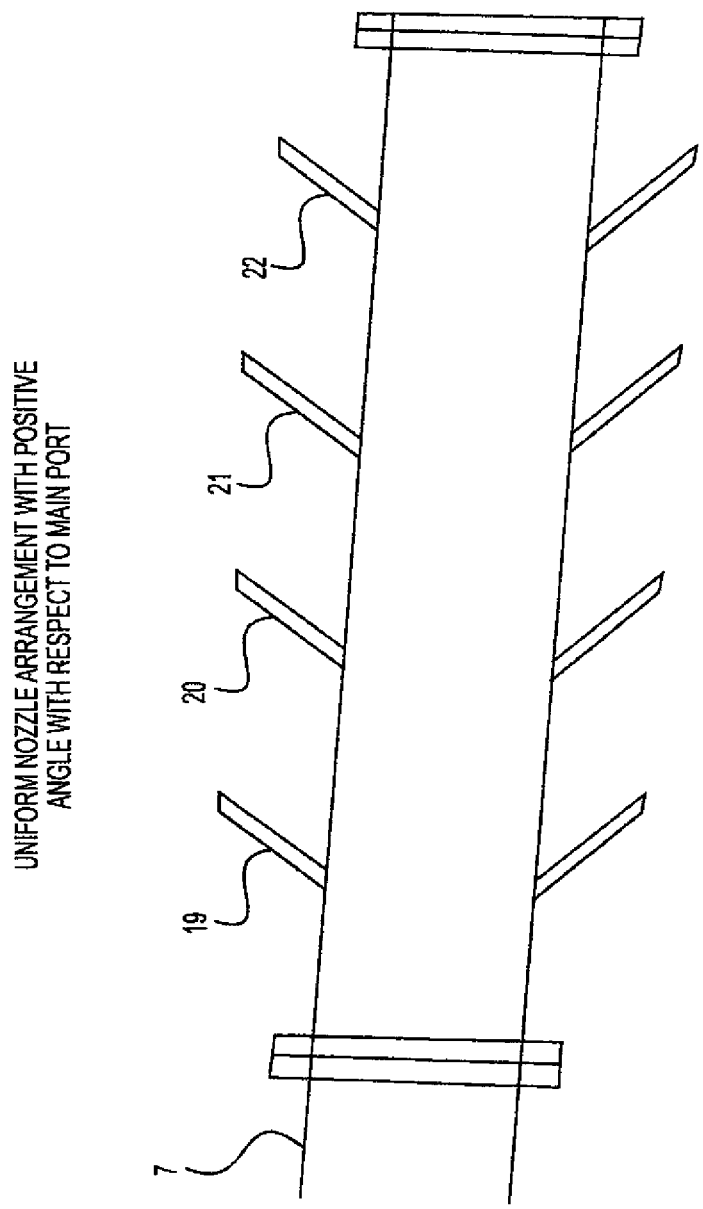
FIG. 4 is example of gas distributor with uniform nozzle spacing and nozzle orientation along the solid and gas flow in the rotary kiln gasifier.
Figure 5:
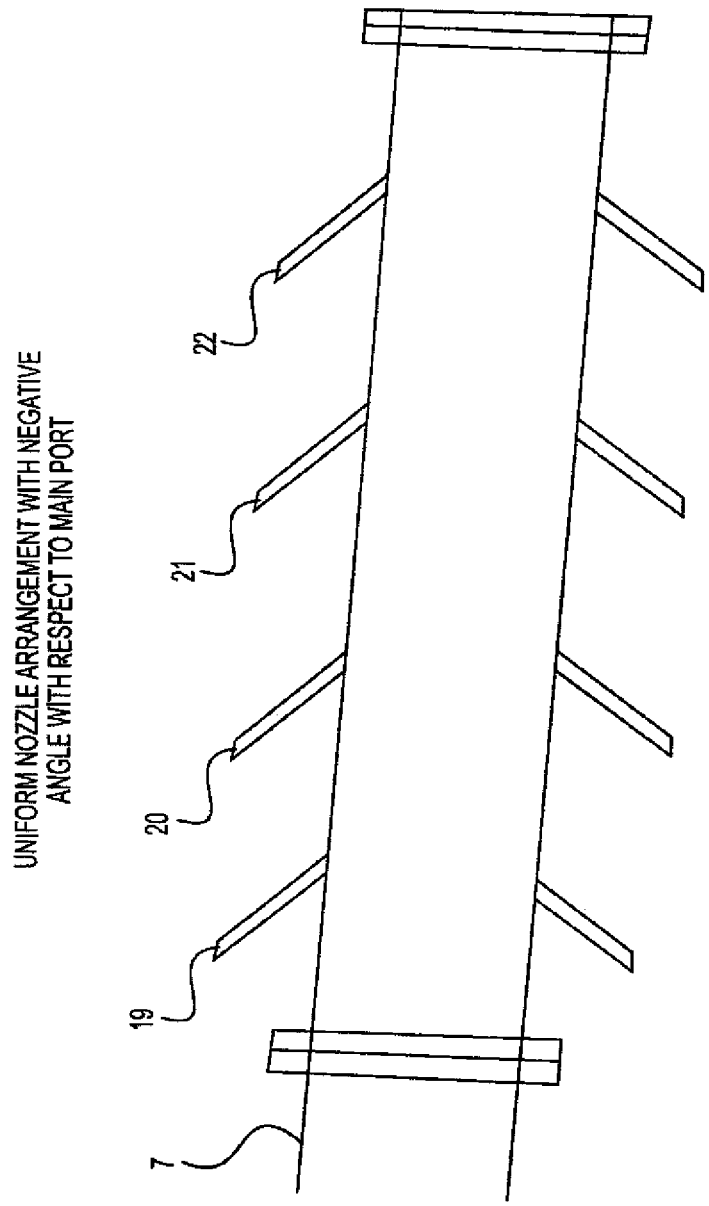
FIG. 5 is example of gas distributor with uniform nozzle spacing and nozzle orientation away from the solid and gas flow in the rotary kiln gasifier.

FIGS. 4 and 5 are mere recitation of FIG. 3 to illustrate the nature of gas assembly 7 when the nozzles 19, 20, 21, and 22 are uniformly oriented in the direction of the solids flow or against the direction of solids flow inside the kiln gasifier 1.

Figure 6:
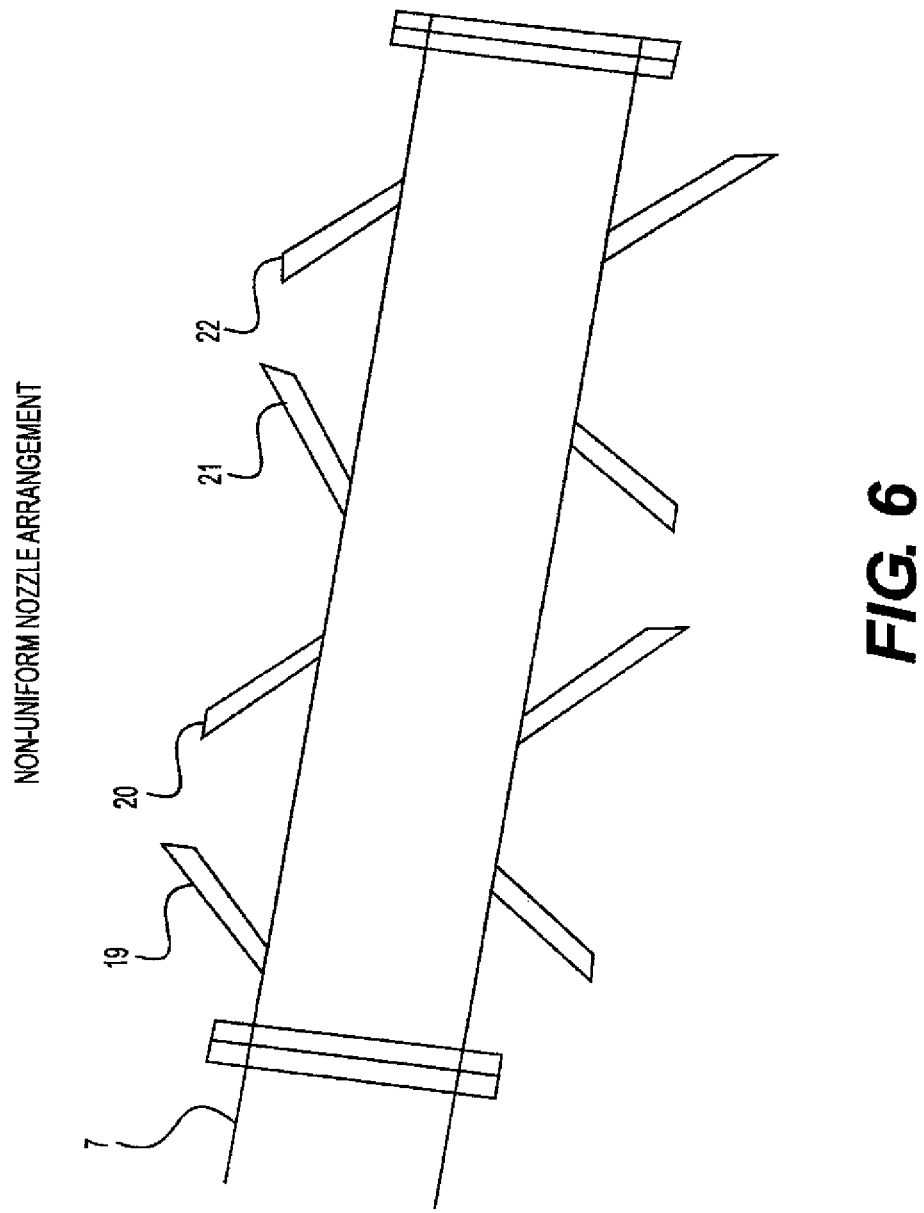
FIG. 6 is example of gas distributor with nonuniform nozzle spacing and nozzle orientation.

Similarly FIG. 6 is a mere recitation of FIG. 3 to illustrate nonuniformity of orientation of the nozzles 19, 20, 21, and 22.

Figure 7:
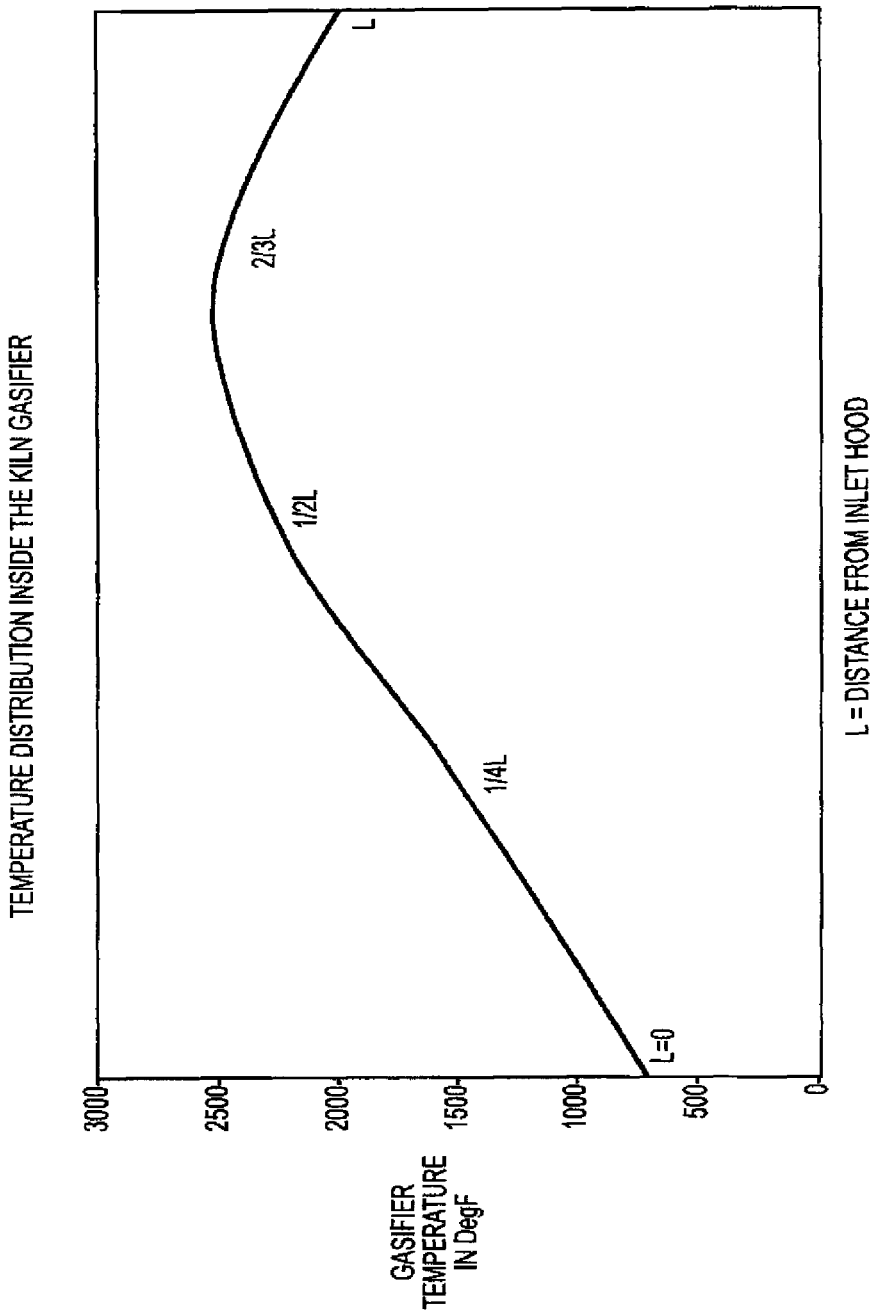
FIG. 7 is a depiction of example of temperature distribution inside the rotary kiln gasifier.

FIG. 7 is an example of depiction of temperature profile within the kiln gasifier 1. The kiln gasifier is generally controlled by the temperature of the fuel gas emanating from the fuel gas discharge nozzle 4. The reactant gases comprising of air, oxygen, and steam entering the kiln gasifier 1 via the gas distributor 7 reacts with carbonaceous solid material entering the reactor via inlet port 2 up to the distance of gas port insertion and to the point blocked by the gas plug 10. The oxygen in the gas will promote partial combustion reactions whereas the steam present in the gas will promote gasification reactions. The moisture present in the solid carbonaceous material would also contribute towards the gasification reactions. Partial combustion of carbonaceous material produces the mixture of carbon dioxide and carbon monoxide whereas gasification reaction of carbonaceous material with steam produces the mixture of hydrogen, carbon monoxide, and carbon dioxide. Eventually all of these gases including residual water attain water gas shift equilibrium when exiting the gasifier. After the partial combustion ceases due to the lack of introducing oxygen any further, the elevated temperature inside the gasifier 1 will continue to enable residual steam in the gas to react with carbonaceous solids to continue to deplete carbon from the nearly all reacted carbonaceous solids. Since the gasification reaction is endothermic, the gasifier 1 temperature will begin to drop as the gas moves towards the exit nozzle 4. Thus as depicted in FIG. 7, it is not unusual for the kiln temperature to progressively increase along the path of the solids within the gasifier 1 until the supply of oxygen is diminished and then decrease progressively. As an example, if the set point temperature at the gasifier 1 exit is controlled at 1800 deg F., the peak temperature in the gasifier could reach as high as 2400 deg F. Again this will depend upon the location of the termination point of the oxidant within the gasifier 1.

The present invention is also useful when practiced as combustor instead of gasification. In this case the nozzles emanating from the main gas port 7 would be extended all the way into the kiln reactor 1 and the amount of air or oxygen introduced will commensurate with the combustor capacity with respect to the carbonaceous material being combusted. The principles stated with respect to nozzle sizing, spacing, and orientation will be accommodated to attain complete combustion of the carbonaceous material.

For person familiar with the art of gasification and combustion will recognize that the amount of air or oxygen introduced into the gasifier 1 is less than fifty percent of the stoichiometric requirement for the complete combustion of the carbonaceous material being gasified whereas in the case of complete combustion, the amount of air introduced into the kiln reactor 1 sometimes exceeds 200 percent of the stoichiometric requirement of the complete combustion of the carbonaceous material depending upon the specified outlet gas temperature in the gas outlet 4.

The present invention has several advantages.

One advantage is that by allowing intimate contact between gas and carbonaceous solids within the kiln gasifier, it is possible to obtain complete gasification of the carbonaceous material.

Another advantage is that by allowing intimate contact between the gas and the solids in the vicinity of heated refractory lining of the kiln, the gasification reaction occurs much more rapidly since the requisite heat for gasification is provided by the heat retained by the refractory lining as well as by the partial combustion of the carbonaceous material with oxygen present in the gas, and therefore it is possible to reduce the overall length of the kiln gasifier.

Yet another advantage is rotation of the gas distributor which enables added turbulence at the wall of the gasifier thereby increasing the interaction between gas and the solids for attaining optimal reaction and better utilization of carbonaceous material.

Yet another advantage of this invention is the flexible orientation of the nozzles.

When the nozzles are oriented such that they are inclined at negative angle with respect to the main port, it results in added residence time for the reactant gases and hence additional time for the gasification reactions to occur. This flexibility would result in total gasification to occur in shorter time and therefore the length of the kiln can be further reduced.

Whilst the invention has been described in detail in terms of specific embodiment thereof, it will be apparent that various changes and modifications can be made by one skilled in the art without deviating from the spirit and scope thereof.

REFERENCES

1. J. H. Howson and K. Casnello "Risk Reduction Measures for the Development of Biomass Rotary Kiln Gasification," Report No. ETSU B/U1/00646/REP and DTI/Pub URN 02/754, issued by DTI Sustainable Energy Programmes for CPL Industries, 2002.
2. G. P. Androutsopoulos, K. S. Hatzilyberis, "Electricity Generation And Atmospheric Pollution: The Role Of Solid Fuels Gasification" presented at 7th International Conference on Environmental Science and Technology Ermoupolis, Syros island, Greece, September 2001 [0056] 3. Francesco Fantozzi, Bruno D'Alessandro, and Umberto Desideri, "An IPRP (Integrated Pyrolysis Regenerated Plant) Microscale Demonstrative Unit in Central Italy" Proceedings of ASME Turbo Expo 2007: Power for Land, Sea and Air, May 14-17, 2007, Montreal, Canada

What is claimed:
1. A rotating distributor for use in a kiln, comprising:
   a gas port extending through the length of the kiln, supported at ends of the kiln, and having an inlet for reactive gases,
   a plurality of nozzles distributed circumferentially and laterally along the main gas port, and
   a gas plug movably mounted in the gas port to restrict air into the kiln, wherein the gas plug is movable within the gas port from outside the kiln to determine the length of the kiln into which reactant gases are introduced, sprockets connected to a variable speed drive, wherein the sprockets are connected to the gas port, and flexible sealed insertions positioned along the gas port to align with the ends of the kiln, wherein the kiln has a vessel, and the gas port extends through the vessel and rotates independently from the vessel.

2. The distributor as claimed in claim 1, wherein the plurality of nozzles are spaced along the gas port.

3. The distributor as claimed in claim 1, wherein the plurality of nozzles are progressively smaller in diameter along the gas port.

4. The rotating distributor in claim 1, wherein the gas port is positioned horizontally with respect to the ground.

5. A kiln, comprising:
(a) a rotary vessel having ends,
(b) a rotating distributor having a gas port extending through the length of the kiln and supported at the ends, a plurality of nozzles along the length of the gas port, the plurality of nozzles distributed circumferentially and laterally along the gas port, a rotating port, and a gas plug mounted in the gas port is movable to restrict air into the kiln, wherein the gas port rotates independently from the kiln vessel and the gas port has an inlet for reactant gases;
(c) a variable speed drive that rotates the gas port;
(d) a gas outlet at one of the ends of the vessel;
(e) flexible seal insertions at the ends of the vessel;
(f) sprockets connected to a variable speed drive
wherein the gas plug is movable within the gas port from outside the kiln to determine the length of the kiln into which reactant gases are introduced.

6. The kiln as claimed in claim 5, wherein the gas port extends approximately two-thirds along the way into the kiln, when the kiln operates as a gasifier.

7. The kiln as claimed in claim 5, wherein the gas plug within the gas port is movable from outside of the kiln.

8. The kiln as claimed in claim 5, wherein the gas plug is movable within the gas port from outside the kiln.

9. The kiln in claim 5, wherein the kiln and the gas port are positioned horizontal with respect to the ground.

10. The kiln in claim 5, wherein the nozzles terminate at a distance between the gas port and a wall of the kiln.

* * * * *